(12) United States Patent
Martin et al.

(10) Patent No.: US 8,633,261 B2
(45) Date of Patent: Jan. 21, 2014

(54) POLYMER COMPOSITES HAVING PARTICLES WITH MIXED ORGANIC MODIFICATIONS

(75) Inventors: Darren Martin, St. Lucia (AU); Grant Edwards, Springwood (AU)

(73) Assignee: The University of Queensland, St. Lucia (AU)

( * ) Notice: Subject to any disclaimer, the term of this patent is extended or adjusted under 35 U.S.C. 154(b) by 147 days.

(21) Appl. No.: 12/937,893

(22) PCT Filed: Apr. 15, 2009

(86) PCT No.: PCT/AU2009/000464
§ 371 (c)(1),
(2), (4) Date: Oct. 14, 2010

(87) PCT Pub. No.: WO2009/127000
PCT Pub. Date: Oct. 22, 2009

(65) Prior Publication Data
US 2011/0060072 A1 Mar. 10, 2011

(30) Foreign Application Priority Data

Apr. 15, 2008 (AU) ................................. 2008901854
Feb. 19, 2009 (AU) ................................. 2009900754

(51) Int. Cl.
*A61F 2/00* (2006.01)
*C08K 9/04* (2006.01)

(52) U.S. Cl.
USPC ........... 523/105; 523/209; 523/216; 427/220; 428/402; 424/422

(58) Field of Classification Search
USPC ........... 523/209, 216, 105; 427/220; 428/402
See application file for complete search history.

(56) References Cited

U.S. PATENT DOCUMENTS

| | | | |
|---|---|---|---|
| 6,057,396 A | 5/2000 | Lan et al. | |
| 6,191,333 B1 * | 2/2001 | Benazzi et al. | 585/749 |
| 6,203,901 B1 | 3/2001 | Kosinski et al. | |
| 6,384,121 B1 | 5/2002 | Barbee et al. | |
| 6,407,155 B1 | 6/2002 | Qian et al. | |
| 6,790,896 B2 | 9/2004 | Chaiko | |
| 6,828,367 B1 | 12/2004 | Campbell | |
| 7,157,516 B2 | 1/2007 | Chaiko | |
| 7,943,690 B2 * | 5/2011 | SenGupta et al. | 524/445 |
| 8,143,346 B2 * | 3/2012 | Diakoumakos et al. | 524/700 |
| 2008/0280001 A1 * | 11/2008 | Sohling et al. | 426/531 |

FOREIGN PATENT DOCUMENTS

WO WO 2007/055793 A2 5/2007
WO WO 2008/122085 10/2008

OTHER PUBLICATIONS

Brochure for Dimethyl Dihydrogenated Tallow Ammonium Chloride, Soap and Detergent Association, 1996.*
International Search Report from PCT/AU2009/000464, mailed May 28, 2009.
Xu, R., et al., "New Biomedical Poly(urethane urea)-Layered Silicate Nanocomposites", Macromolecules, 2001, v34, pp. 337-339.

* cited by examiner

Primary Examiner — Tae H Yoon
(74) Attorney, Agent, or Firm — Wolf, Greenfield & Sacks, P.C.

(57) ABSTRACT

The present invention relates to polymer composites prepared from a host polymer and particles. Specifically, this invention is concerned with the organic modification of the particles. More specifically, the particles are organically modified with at least two organic modifiers that are different and have specific chemical and physical properties.

43 Claims, 2 Drawing Sheets

POLYMER COMPOSITES HAVING PARTICLES WITH MIXED ORGANIC MODIFICATIONS

FIELD OF THE INVENTION

This invention relates to the field of polymer composites prepared from a host polymer and particles. Specifically, this invention is concerned with the organic modification of the particles. More specifically, the particles are organically modified with at least two organic modifiers that are of different chemical and physical properties.

BACKGROUND OF THE INVENTION

Polymers are versatile as construction material due to the relative ease with which they can be formed into either simple or complex shapes. Products traditionally manufactured from glass, wood, ceramic or metal are increasingly being manufactured from polymer materials.

An important factor in selecting a polymer as a substitute material for making an existing product, or as a material for making a new product, is to ensure that the polymer has the requisite chemical and/or physical properties to enable the product to adequately perform its intended function. To a large extent, the chemical and/or physical properties of a polymer are to be determined by its molecular structure. Such properties can, however, also be influenced by the presence of reinforcing additives, such as solid particulate material dispersed throughout the polymer matrix to form a composite structure.

A polymer composite can often exhibit enhanced chemical and/or physical properties compared with those exhibited by the host polymer (that is, in the absence of the solid particulate material). For this reason, polymer composites are used extensively to manufacture products across a diverse array of industries, including the aeronautical, automotive and biomedical industries.

A rapidly developing field of polymer composite technology is that of polymer nanocomposites. Polymer nanocomposites are typically prepared by dispersing spheres, clusters, layers, tubes, rods or networks or nanometre sized ($10^{-9}$ to $<10^{-6}$ m) solid particulate material throughout a host polymer matrix. In order to have the solid particulate material disperse to a sufficient degree, it has been found in the art that the solid particulate material often needs to be organically modified to result in better interaction between the host polymer and the solid particulate material. Interaction as used herein refers to chemical bonding or physical association of the host polymer with the solid particulate material, preferably by way of the organic modifier. Such nanocomposites having better interaction then exhibit further enhanced chemical and/or physical properties compared with a corresponding polymer composite having dispersed micrometer sized solid particulate material or presumably unmodified nanometer sized solid particulate material (should they be able to be dispersed sufficiently), and of course can have enhanced chemical and/or physical properties compared with those exhibited by the host polymer absent the solid particulate material.

One method commonly known in the art of increasing the interaction between the host polymer and the solid particulate material is to apply an organic modifier to a surface of the solid particulate material. That is, the interaction then occurs between the organic modifier of the solid particulate material and the host polymer. The literature predominantly teaches the use of a single organic modifier. The literature that does reference the use of more than one organic modifier does not comprehensively teach how the interaction of the host polymer and the solid particulate material may be enhanced.

SUMMARY OF THE INVENTION

The inventors have found that for some host polymers, particularly those that comprise a phase nanodomain, a single organic modifier is less than ideal. Specifically, the inventors have found that a polymer composite can be prepared by modifying the solid particulate material with at least two organic modifiers. The inventors have further found that the efficacy of the at least two organic modifiers, at least in interacting with the host polymer, depends heavily on the relative miscibility of the two organic modifiers and the method by which the solid particulate material is modified with the at least two organic modifiers. Specifically, the inventors have found that it is necessary to modify the surface of the solid particulate material using a method that causes the organic modifiers to present on the surface of the solid particulate material in a particular way. Namely, the organic modifiers form regions that substantially consist of a single type of organic modifier on the surface of the solid particulate material. The inventors have found that one way of obtaining regions of organic modifier on the surface of the solid particulate material is to add the solid particulate material to the organic modifiers, rather than the typical method of adding the organic modifier to the solid particulate material. More specifically, the organic modifiers are preferably in solution prior to addition of the solid particulate material to the solution.

More specifically still, the inventors believe that selection of organic modifiers of particular properties is also important to cause them to be present on the surface of the solid particulate material in regions that enhance the interaction between the solid particulate material and the host polymer. That is, the interaction between the solid particulate material and the host polymer is greater and stronger in the polymer composites of the present invention than in the case of a polymer composite prepared from a host polymer combined with a solid particulate material modified with a single organic modifier, or with more than one organic modifier where the method of the present invention is not used.

Without wishing to be bound by theory, the inventors believe that the cause of the enhanced interaction is due to the formation of regions (discussed further below), and that the result of this enhanced interaction on the mechanical properties of the polymer composite as compared to the host polymer is potentially two-fold: (1) the solid particulate material is spaced further apart within the host polymer, also referred to as greater intercalation, dispersion or exfoliation, thus enabling improved interactions with phase nanodomain(s) (2) there is a greater transfer of mechanical load to the solid particulate material at all strains, although particularly significant at high strains, which results in increased strength. Recent literature evidence suggests that greater dispersion does not necessarily lead to greater mechanical properties. Contrarily, without wishing to be bound by theory, it is being suggested that it is in fact greater interaction that leads to greater mechanical properties. In any case, both dispersion (and exposure of large surface area interfacial interactions providing enhancement via the confinement of chains and the inhibition of molecular movement) and secondary interactions (eg stress transfer and the direct transfer of energy to the particle) enable the best balance and ability to tailor properties like strength, stiffness, toughness and tear resistance (for example, toughness and tear strength rely on good and strong interactions, but it is important that these be not too strong as this can lead to stiffening and embrittlement). The use of more than one organic modifier allows greater flexibility.

Properties of the organic modifier upon which the organic modifier can be specifically selected for the purpose of this invention include their chain length, polarity and shape. Thus, for instance, the inventors have discovered that a polymer composite can be formed having a stronger interaction between the host polymer and the solid particulate material than would be typical for a solid particulate material modified with either (i) a single organic modifier or (ii) multiple organic modifiers that do not have the requisite properties or (iii) multiple organic modifiers that are applied to the solid particulate material using a method other than that of the present invention. The inventors have found this effect to be irrespective of the nanoscale size of the solid particulate material such that solid particulate material of a range of nanoscale sizes can be used.

Figure 1:
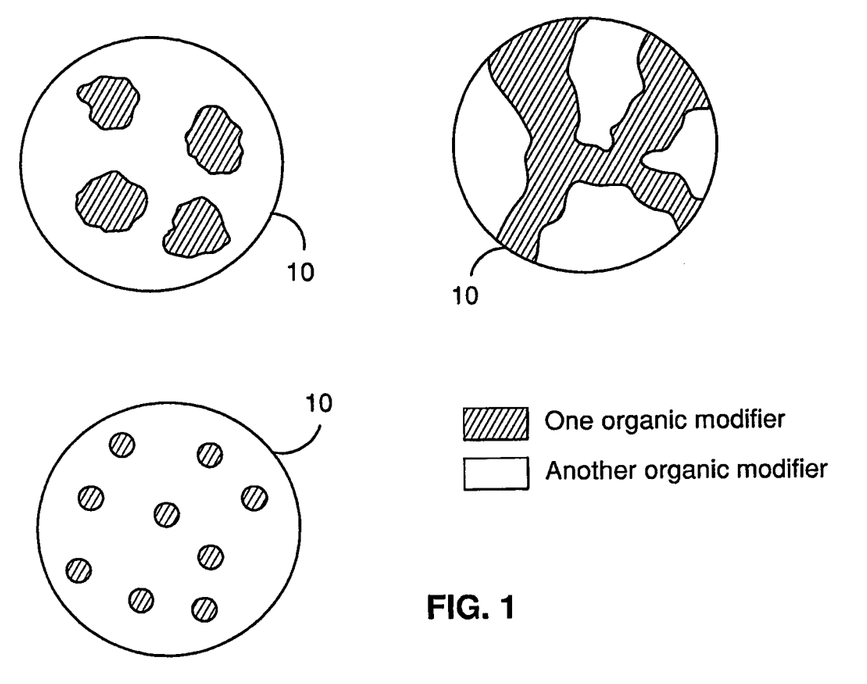
FIG. 1—Schematic representation of the proposed clustering of organic modifiers on the surface of the solid particulate material of the present invention (plan view).

Without wishing to be bound by theory, the inventors believe that in combination with the method of modifying, the organic modifiers of the present invention must also be selected so that they may arrange themselves on the surface of the solid particulate material in a clustered formation. That is, the surface of the solid particulate material of the present invention has some regions that consist of a single organic modifier type, and other regions that consist of another single organic modifier type. The exact nature of these regions of organic modifier on the surface of the solid particulate material is not presently known to the inventors. For instance, the dimensions of the regions of organic modifier and whether they are continuous or discontinuous is unknown. However, the inventors believe that regions of organic modifier that are of a morphology that is consistent with the morphology of the phase nanodomains of the host polymer is preferred. Some schematics representing the potential clustering arrangement of the organic modifiers on the surface of the solid particulate material 10 are shown in FIG. 1.

Figure 2:
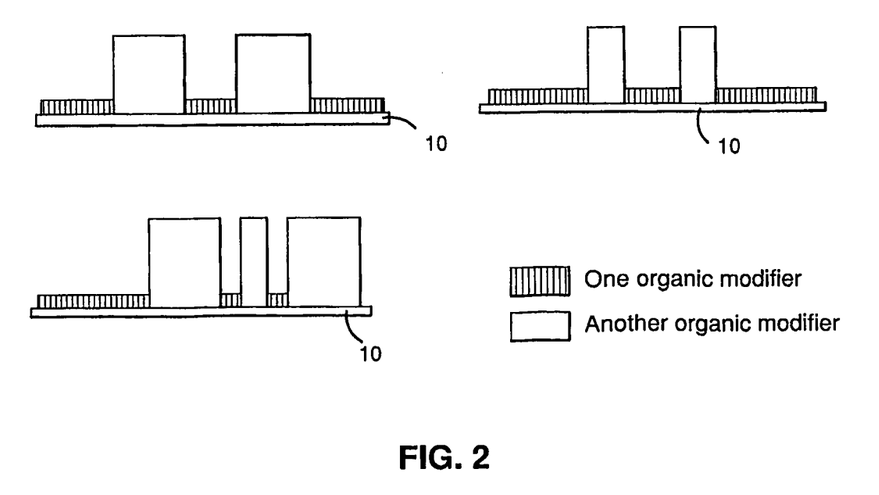
FIG. 2—Schematic representation of the proposed roughened surface of the solid particulate material of the present invention caused by a combination of the proposed clustering of organic modifiers of varying chain lengths (section view).

Further, the inventors believe that a significant contributor to the present invention is that the organic modifiers be of substantially different chain lengths and differing polarity. For instance, a solid particulate material organically modified with two organic modifiers would have one first organic modifier and one second organic modifier. Organic modifiers of substantially different chain lengths arranged in clusters on the surface of the solid particulate material would 'roughen', or apply a 'texture' to, the surface of the solid particulate material. That is, the organic modifier molecules would not all extend from the surface of the solid particulate material to substantially the same distance (as they would for a singly modified solid particulate material), and would thus cause the organic modified surface of the solid particulate material to appear roughened, or textured. Organic modifiers of substantially different polarity may more readily form micelles in solution which may enhance the formation of regions. Further, the inventors hypothesise that the difference in polarity causes the longer chain to extend a larger distance from the surface of the solid particulate material than it would in the absence of the shorter chain. This roughening, or texturing, increases the effectiveness of interaction between the organic modifiers of the solid particulate material and the host polymer. Some schematics representing the roughening of the surface of the solid particulate material 10 are shown in FIG. 2.

Figure 3:
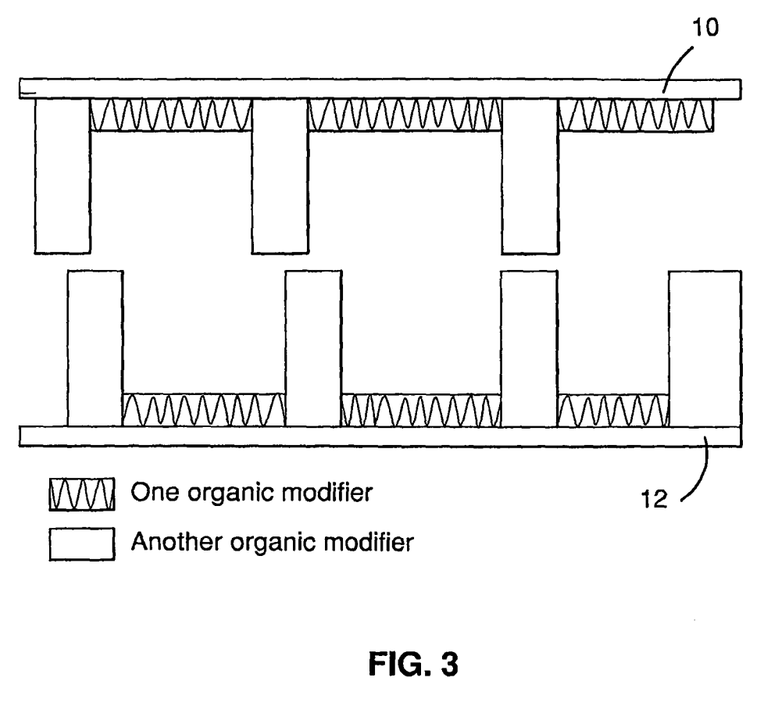
FIG. 3—Schematic representing the creation of a penetrating space between two opposing surfaces of two adjacent particulates of the present invention (section view).

As well, for a polymer composite comprising a solid particulate material that is a structured arrangement of adjacent particulates, such as a layered silicate material, the roughening of two opposing surfaces of the solid particulate material simultaneously (i) increases the distance between any two opposing surfaces (by virtue of the longer organic modifier 'pushing apart' the two adjacent particulates), (ii) creates a 'penetrating space' between the two opposing surfaces of two adjacent particulates into which the host polymer can penetrate (by virtue of the first organic modifier not filling all of the provided space), and (iii) the (inventors believe) also accommodates hard- and soft-segments and phase nanodomains in a more thermodynamically-efficient manner. An alternative to referring to hard- and soft-segments is to refer to domains of higher and lower solubility parameter (compared to each other). A schematic representing the creation of a penetrating space between two opposing surfaces of two adjacent particulates 10 and 12 is shown in FIG. 3.

Accordingly, in an aspect of the present invention, there is provided a method for modifying a solid particulate material comprising suspending at least two organic modifiers in a solvent to form a mixture of organic modifiers, the at least two organic modifiers comprising at least one polar organic modifier and at least one non-polar organic modifier and/or substantially non polar modifier; and adding the solid particulate material to the mixture of organic modifiers to modify the particulate material.

In a preferred form of the invention, the method further comprises the step of drying the solid particulate material.

In another aspect of the present invention there is provided a modified solid particulate material comprising particles having dimensions of less than about 2000 nm, the particles having at least one surface that is co-modified with at least two organic modifiers comprising at least one polar organic modifier and at least one non-polar organic modifier, wherein the solid particulate material is co-modified by adding the solid particulate material to a mixture of the at least two organic modifiers suspended in a solvent to modify the solid particulate material.

In a preferred form of this aspect, the modified solid particulate is subsequently dried and is the dried form of the material.

In another aspect, there is provided a modified solid particulate material comprising particles having dimensions of less than about 2000 nm; the particles having at least one surface co-modified with at least two organic modifiers comprising at least one polar organic modifier and at least one non-polar organic modifier;

wherein the at least two organic modifiers are in regions on the at least one surface of the particles, each region consisting essentially of one organic modifier.

The regions are preferably formed by suspending the at least two organic modifiers in a solvent to form a mixture of organic modifiers, and adding the solid particulate material to the mixture of organic modifiers to modify the solid particulate material.

The modified solid particulate material is preferably dried.

In another aspect there is provided a polymer composite comprising a host polymer having solid particulate material dispersed there through, the host polymer having at least one phase nanodomain;

the solid particulate material comprising particles having dimensions of less than about 2000 nm; the particles having at least one surface co-modified with at least two organic modifiers comprising at least one polar organic modifier and at least one non-polar organic modifier;

wherein the solid particulate material is co-modified by adding the solid particulate material to a mixture of the at least two organic modifiers suspended in a solvent to modify the solid particulate material.

The modified solid particulate material is preferably dried and dispersed uniformly within the host polymer In another aspect there is provided a polymer composite comprising a host polymer having solid particulate material dispersed therethrough, the host polymer having at least one phase nanodomain;

particles having dimensions of less than about 2000 nm;
the particles having at least one surface co-modified with at least two organic modifiers comprising at least one polar organic modifier and at least one non-polar organic modifier;
wherein the at least two organic modifiers are in regions on the at least one surface of the particles, each region consisting essentially of one organic modifier.

The regions are preferably formed by suspending the at least two organic modifiers in a solvent to form a mixture of organic modifiers, and adding the solid particulate material to the mixture of organic modifiers.

The modified solid particulate material is preferably dried and distributed uniformly in the host polymer.

The inventors believe that the process of adding the organic modifier to the surface of the solid particulate material in such a way as to form regions on the surface of the solid particulate material, that is, by adding the organic modifiers to a solvent before adding a solid particulate material to the organic modifier in the solvent, is also enhanced if the organic modifiers form micelles in solution and/or are added to solution prior to the addition of the solid particulate material (during the organic modifying process). The inventors believe that a certain difference in miscibility, which is dependent on, for example, chain length and polarity, is necessary for the organic modifiers to form micelles. This difference in miscibility may be any that causes the at least two organic modifiers to substantially phase separate when combined as a solution.

In a preferred form of the above embodiments of the invention the polymer composite comprises a first organic modifier that has a chain length at least 4 atoms less than the chain length of the second organic modifier and preferably the first organic modifier has a chain length at least about 5 to 20 atoms less than the chain length of the second organic modifier. The inventors believe that this difference in chain length is necessary for creation of regions of organic modifier on, and roughening by the presence of the organic modifier of, the surface of the solid particulate material.

The first organic modifier may be a molecular chain length of no more than about 8 atoms and preferably comprises a choline compound, such as choline chloride.

The second organic modifier may have a molecular chain length of no less than about 12 atoms and preferably comprises a quaternary ammonium compound, such as octadecyltrimethyl ammonium or oleyl-bis-(2-hydroxyethyl)methylammonium chloride.

The polar organic modifier preferably has a polar moiety at the end of the organic modifier that interacts with the host polymer. The polar moiety may be a hydroxyl, carbonyl, carboxyl, nitrogen containing, fluorine containing, sulphur containing, or the like as presently known in the art but is preferably a hydroxyl group. In a preferred embodiment, the polar organic modifier is the first organic modifier (that is, the organic modifier having a chain length shorter than the organic modifier having the longest chain length).

The organic modifiers may be branched.

Preferably, the solvent in which the organic modifiers and then the solid particulate material are mixed is an organic solvent, however some TPUs will dissolve in an aqueous solvent. For instance, the organic solvent may be dimethylacetamide, dimethylformamide, chloroform, cyclohexanone, cyclopentanone, dimethylsulfoxide, dioxane, methylene chloride or acetone. Most preferably, the organic solvent is dimethylacetamide. The terms 'solvent' is used herein to refer to liquids, fluids and/or solutions that dissolve, disperse and/or suspend (to some degree) a solute, particle, colloid, and/or compound. That is, the use of the term solvent is not intended to limit to scope of the invention to the dissolution of solutes. Likewise, a 'solution' is not intended to refer to only a substance dissolved in a solvent.

The polymer composite according to the invention may also comprise a non-polar organic modifier that does not have a polar moiety at the end of the organic modifier that interacts with the host polymer.

The polymer composite according to the invention may comprise a segmented polyurethane. Further, the segmented polyurethane comprises at least one phase nanodomain derived from poly(tetramethylene oxide) and at least one phase nanodomain derived from 4,4'-methylene diphenyl diisocyanate/1,4-butane diol. Alternatively, the segmented polyurethane comprises at least one phase nanodomain derived from poly(tetramethylene oxide) and at least one phase nanodomain derived from 4,4'-methylenebis (cyclohexyl isocyanate) (H12MDI)/1,4-butane diol.

The polymer composite according to the above invention preferably has tensile strength greater than the tensile strength of the host polymer. For instance, the tensile strength of the polymer composite may be from about 110% to about 250% of the tensile strength of the host polymer.

The polymer composite according to the above invention may have various tensile elastic moduli with respect to the tensile elastic modulus of the host polymer. For instance, the tensile elastic modulus of the polymer composite may be from about 85% to about 300% of the tensile elastic modulus of the host polymer. That is, in some cases the tensile elastic modulus of the polymer composite may be less than, and in other cases not significantly greater than, the tensile elastic modulus of the host polymer.

The solid particulate material preferably has dimensions of less than about 2000 nm. Preferably, the dimensions are less than about 1500 nm. Further, at least one of the dimensions of the solid particulate material is less than about 20 nm. The solid particulate material may be a layered silicate material, and at least one of the dimensions of the silicate particles is preferably less than about 2 nm. Preferably, at least one of the dimensions of the particles is about 1 nm. The solid particulate material may be a layered double hydroxide or the like material, and at least one of the dimensions of the particles is preferably about 15 to about 20 nm.

The particles may have a height, length and width dimension of which at least one is substantially less than one or both of the other dimensions. The particles may have height, length and width dimensions which are all about 100 nm or less. Preferably, the particles may have height, length and width dimensions which are all about 50 nm or less.

In another aspect of the present invention there is provided a method of preparing a polymer composite comprising a host polymer and a solid particulate material described above.

In another aspect of the present invention, there is provided a use of the above solid particulate material in the preparation of a polymer composite.

In another aspect of the present invention there is provided a use of the above polymer composite as a biomaterial.

In another aspect of the present invention there is provided a use of the above polymer composite in the manufacture of a biomedical device.

DETAILED DESCRIPTION OF THE EMBODIMENTS

A. Polymers

A polymer composite in accordance with the invention comprises a host polymer having at least one phase domain. Preferably the phase domain is a phase nanodomain.

The host polymer serves to accommodate solid particulate material dispersed throughout its polymeric matrix. Thus, as used herein the term "host polymer" is used to refer to polymer having solid particulate material dispersed throughout its polymeric matrix. However, reference simply to polymer does not exclude that polymer being a host polymer.

The polymer composite may comprise one or more other different polymers, which may also be host polymers. Preferably the host polymer represents at least 50 w %, more preferably at least 75 w % and most preferably 100 w % of the total polymer content (host polymer plus the one or more other different polymers) of the polymer composite.

Host polymers and the one or more polymers may exhibit thermoplastic or thermoset properties. Suitable thermoplastic polymers for either the host polymer or the one or more other different polymers include, but are not limited to, poly(acrylic acid), poly(butyl methacrylate), polycarbonate, poly(dimethylsiloxane), poly(ethylene oxide), poly(ethylene propylene), poly(ethyl vinyl acetate), poly(methyl methacrylate), polystyrene, poly(vinyl acetate), poly(vinyl methyl ether), poly(vinyl pyrolidone), poly(dimethyl diallyl ammonium chloride), polyethylene, polypropylene, polyimide, poly(vinyl methyl ether), poly(propylene carbonate), and combinations thereof. Suitable thermoset polymers include, but are not limited to, those derived from unsaturated polyester resins, epoxy resins, natural or synthetic rubber, and combinations thereof. Thus, the host polymer may be castable and/or crosslinked.

"Phase nanodomain" is used herein to mean that the host polymer includes, as part of the polymer, a domain that has at least one dimension of nanoscale size (1 nm to <1000 nm) and which is substantially uniform in chemical composition and physical state. Those skilled in the art will appreciate that such a domain in effect represents a section or portion of the molecular chain structure of the host polymer, and that the domain may be present as a continuous or discontinuous phase (phase nanodomain formation in TPUs is largely due to blocks of differing solubility parameter arranging, themselves in order to minimise surface free energy). By having at least one phase nanodomain, the host polymer inherently must provide for at least one other phase domain (that is, the portion of the host polymer not present in the at least one phase nanodomain). The at least one other phase domain may present as a continuous or discontinuous phase domain, and may also itself be a phase nanodomain.

Without wishing to be bound by theory, the inventors believe that maximising the correlation of the regions of organic modifier on the surface of the solid particulate material with the domains of the host polymer will lead to maximal interaction between the solid particulate material and the host polymer. Thus, for instance, in the case of one preferred polyurethane, a solid particulate material having regions of a relatively hydrophobic organic modifier aligned with the poly(tetramethylene oxide) segments/domains, and regions of a relatively hydrophilic organic modifier aligned with the methylene diphenol diisocyanate/1,4-butane diol segments/domains, is preferred. As another example, in the case of another preferred polyurethane, a solid particulate material having regions of a relatively hydrophobic organic modifier aligned with the poly(tetramethylene oxide) segments/domains, and regions of a relatively hydrophilic organic modifier aligned with the 4,4'-methylenebis (cyclohexyl isocyanate) (H12MDI)/1,4-butane diol segments/domains, is preferred.

A phase nanodomain polymer morphology is typically provided by block, graft, or segmented copolymers. The phase nanodomains can be either hard or soft in nature. By being "hard" it is meant that the domains have a glass transition temperature ($T_g$) that is higher than the temperature at which the polymer is to be used. By being "soft" it is meant that the domains have a $T_g$ that is lower then the temperature at which the polymer is to be used. A "soft" domain may be referred to as being rubbery. For avoidance of any doubt, reference to "hard domains" and "soft domains" herein will be the state of those domains at 25° C.

The host polymer used in accordance with the invention may provide for various combinations of hard/soft and continuous/discontinuous phase domains. For example, the host polymer may provide for a co-continuous morphology whereby hard and soft phase nanodomains both exist as continuous phases. Preferably, the host polymer in accordance with the invention provides for a soft continuous phase nanodomain and a hard discontinuous phase nanodomain.

Although by definition a phase nanodomain only requires at least one dimension which ranges from about 1 nm to less than 1000 nm, the phase nanodomain(s) of the host polymer will typically have at least one dimension that ranges from about 1 nm to about 100 nm. Preferably, the phase nanodomain(s) will have at least one dimension that ranges from about 1 nm to about 40 nm, more preferably from about 2-5 nm to about 20 nm.

Suitable host polymers that may provide for a phase nanodomain include, but are not limited to, polyurethane, polyurea, polyurethaneurea, polyesteramide, polyetheramide, ethylene propylene random copolymer, polycaprolactone-etheramide, polyimide, polyurethane-imide, polyetherimide, polyetherester, polyesterurethane, poly(ethylene terephthalate)-poly(ethylene oxide), polydimethylsiloxane-containing segmented copolymers, copolyetheresteramides, copolyethylene trephthalate-ethylene oxide, polyurethane-polydimethylsiloxane, styrene block copolymers, polyamide thermoplastic elastomers, styrene-butadiene copolymer (SBC), copolyester elastomers (COPE), poly(ether-block-amide) thermoplastic elastomer (PEBA TPE) Polystyrene-Polymethylmethacrylate (PS-PMMA), and Poly(urethane-co-acrylic acid).

As mentioned above, the host polymer may be a thermoplastic elastomer. By a "thermoplastic elastomer" is meant a thermoplastic co-polymer which has, as part of its macromolecular chain structure, sequences or segments which phase separate to provide a phase nanodomain. Such a co-polymer will generally comprise hard-segment and soft-segment phase domains. At least one of the phase separated domains must provide for a rubbery or soft phase domain. All of the host polymers listed in the immediately preceding paragraph are thermoplastic elastomers.

A preferred thermoplastic elastomer is a thermoplastic segmented polyurethane (TPU). Segmented TPUs are linear block co-polymers consisting of hard and soft segments. The hard-segment is typically composed of alternating diisocyanate and chain extender molecules (eg. diol or diamine compounds), while the soft-segment is formed from a linear long-chain polyol. Due to their thermodynamic incompatibility, the hard and soft segments phase separate to a certain extent. These phase separated segments tend to aggregate into domains resulting in a structure having glassy, hard domains, and rubbery, soft domains, that are respectively below and above their $T_g$'s. The hard domains gain their rigidity through physical crosslinking (ie. hydrogen bonding between hard segments and as opposed to chemical crosslinks such as covalent bonds), and provide filler-like reinforcement to the soft domains.

The hard or soft segments in TPUs may provide for a phase nanodomain. Generally, both the hard and soft segments will each provide for a phase nanodomain. The hard or soft segments may also be present as the continuous or discontinuous phase. To a large extent, the nature of the continuous or discontinuous phase will be dictated by the weight % of each segment present in the co-polymer, with the segment present in the lowest weight % generally forming the discontinuous phase. It is preferred that the discontinuous phase is formed by the hard segments, and these segments therefore preferably represent less than 60 w %, more preferably less than 40 w %, most preferably from about 10 to about 35 w % of the TPU. A similar reasoning can also be applied to polymers comprising at least one phase nanodomain that are not TPUs.

Constituents from which TPUs may be derived, namely diisocyanates, chain extender compounds and polyols, are generally well known to those skilled in the art. Suitable diisocyanate compounds include, but are not limited to 4,4'-methylene diphenyl diisocyanate (MDI), toluene diisocyanate (TDI), naphthalene diisocyanate (NDI), hexamethylene diisocyanate (HDI), 4,4'-methylenebis(cyclohexyl iso-cyanate) (H12 MDI), isophorone diisocyanate (IPDI), and mixtures thereof.

Suitable chain extender compounds include, but are not limited to, ethylene diamine, 1,3-cyclohexane diamine (HMPD), 1,4-cyclohexane diamine (HPPD), 1,3-propylene diamine (1,3-PDA), 2-methylpentamethylene diamine (MPMD), 1,2-propylene diamine (1,2-PDA), 1,2-diaminoethane (EDA), ethylene glycol (EG), tetramethylene glycol (TMG), 1,4-butanediol (BDO), 1,4-cycloxehane dimethanol (CHDM), bishydroxybutyl tetramethyldisiloxane (BHTD), 2,2'-dimethyl propanediol (DPMD) and 2,2'-diethyl propanediol (DEPD), and mixtures thereof.

Suitable polyol compounds include, but are not limited to, polyethers such as those derived from tetramethylene glycol, ethylene glycol, propylene glycol, 3-methyl-1,5-pentanediol, tetrahydrofuran, 3-methyltetrahydrofuran, and co-polymers thereof, glycol-terminated polyesters such as those derived from the reaction products of ethylene glycol, tetramethylene glycol, and/or 2,2-dimethyl-1,3-propane diol with di-acids such as adipic acid, succinic acid, dodecanedioic acid, and combinations thereof, and polyetheresters derived from the aforementioned polyethers and polyesters, and diol-terminated polycarbonates such as poly(pentane-1,5-carbonate) diol and poly(hexane-1,6-carbonate)diol, and combinations thereof, polycarbonate-based polyols, polydimethylsiloxane-based polyols, and poly(hexamethylene oxide)-based polyols Generally, the number average molecular weight of the polyols will be in the range of 400 to 4000 Da.

A preferred segmented TPU is one which is derived from a poly(tetramethylene oxide) soft segment and a 4,4'-methylene diphenol diisocyanate/1,4-butane diol hard segment. Another preferred segmented TPU is one which is derived from a poly(tetramethylene oxide) soft segment and a 4,4'-methylenebis (cyclohexyl isocyanate) (H12MDI)/1,4-butane diol hard segment.

Other preferred TPUs and preferred thermoplastic elastomers that may be used as the host polymer in accordance with the invention include, but are not limited to, those described in WO 99/50327, WO 99/03863, WO 98/54242, WO 98/13405, WO 92/00338, WO 01/07499, WO 00/64971, and their US equivalents, the entire contents of which are incorporated herein by cross reference. Preferred thermoplastic elastomers are sold under the tradenames ElastEon® by Aortech Biomaterials, Biospan®, Bionate®, Elasthane™, PurSil™ and Carbosil™ by The Polymer Technology Group, Pellethane™ by Dow, Spandex, Lycra® by Invista, Chronoflex® and Chronothane® by Cardiotech International, Tecoflex®, Tecothane®, Carbothane®, Tecoplast®, and Tecophilic® by Lubrizol Advanced Materials, Inc., Desmopan® by Bayer Materials Science, Elastollan® by BASF, Surlyn® by DuPont, and other TPUs by Huntsman and Merquinsa.

As mentioned above, the host polymer need not be a thermoplastic polymer, and may instead be a thermoset polymer. Some examples of preferred thermoset polymers are castable, reactively extruded (REX) and reaction injection moulded (RIM) elastomeric polyurethanes.

B. Types of Solid Particulate Material

The solid particulate material may also be referred to herein and in the art as nanoparticles. Nanoparticles have height, length and width dimensions which are all about 2000 nm or less. The nanoparticles may have height, length and width dimensions which are all about 100 nm or less. Preferably, the nanoparticles may have height, length and width dimensions which are all about 50 nm or less. By "height, length and width dimensions" is meant that the particles are in effect three dimensional objects by virtue of presenting dimensions in the x, y, and z directions of a standard three dimensional axis. The height of the small nanoparticles may alternatively be known as its thickness.

Typically the height or thickness of the nanoparticles is substantially less than 20 nm. In some embodiments, the height or thickness of the nanoparticles is preferably substantially less than 3 nm, and more preferably about 1 nm.

In considering the geometric attributes of the nanoparticles, it can be convenient to refer to the aspect ratio of the nanoparticles. As used herein, the term "aspect ratio" is intended to define the ratio between the largest dimension and the smallest dimension of the nanoparticles. The present invention is not dependent on the nanoparticles having a particular aspect ratio. That is, a nanoparticle of any aspect ratio is suitable for preparation of a polymer composite in accordance with the present invention. Preferably, the aspect ratio of the nanoparticles is at least about 5:1 to about 1000:1. More preferably, the aspect ratio of the nanoparticles is at least about 10:1 to 1000:1. Nanoparticles might therefore be described as having alternatively an elongate or platelet-like shape.

Solid particulate materials may comprise nanoparticles having a uniform chemistry, shape and/or size or a non-uniform chemistry, shape and/or size, that is, a shape and/or size distribution. Therefore, the distribution may comprise nanoparticles that are of a different chemical composition to each other.

A diverse array of solid particulate materials may be used in accordance with the present invention provided that they can be dispersed throughout the host polymer. Suitable particulate materials include, but are not limited to, metal oxides, metal phosphonates, carbon or boron nanotubes or fibres, layered silicates, layered double hydroxides or like materials, or combinations thereof.

Those skilled in the art will appreciate that there is a diverse array of nanoscale metal oxide particles. There is no particular limitation as to the type of metal oxide that may be used as the solid particulate material in accordance with the invention. Illustrative metal oxides include, but are not limited to, alumina, silica, zirconia, titania, $Cr_2O_3$, $CeO_2$, and $La_2O_3$.

Likewise, those skilled in the art will realise that there is a diverse array of nanoscale metal phosphonates. There is no particular limitation as to the type of metal phosphonate that may be used as the solid particulate material in accordance with the invention. Illustrative metal phosphonates include, but are not limited to, zinc (phosphate-co-phenylphosphonate), zinc (phosphate-co-octylphosphonate), zinc (phosphate-co-benzylphosphonate), zinc (phosphate-co-decylphosphonate), calcium (phosphate-co-phenylphosphonate), calcium bis(phenylphosphonate), and magnesium (phosphate-co-decylphosphonate)

Carbon or boron nanotubes or nanofibres are known in the art and do not need to be described in detail here. Preferred carbon or boron nanotubes or nanofibres are those having a length of less than 100 nm.

As used herein, the term "layered silicate" is intended to be a reference to materials which have as part of their molecular structure sheet sub-structures derived from the $(SiO_4)_n^{4-}$ repeat unit. Such materials may also be referred to as a "phyllosilicate", a word having a Latin origin meaning sheet-like silicate. The silica sheets in layered silicates are generally associated with one or more other sheet sub-structures, for example alumina sheets, to provide for a layer which is repeated throughout the material. In an ideal structure, these repeating layers are held together by van der Waals bonds and are separated by an interlayer space which may contain water.

However, in reality the structure of layered silicates is usually more complex as a result of isomorphous substitutions. Thus, in practice, substitution of atoms within the layered silicate structure with atoms having a lower valance state and/or vacancies in the layered structure lattice generally results in a residual negative charge within the layers. This residual negative charge is in turn balanced by the inclusion of cations such as $Na^+$, $K^+$ and $Ca^{2+}$ etc which reside within the interlayer space and give rise to the cation exchange capacity (CEC) of layered silicates.

Layered silicates that can be used as the solid particulate material in accordance with the invention may be naturally derived or synthetically prepared. Suitable natural layered silicates include, but are not limited to, smectite clays, such as montmorillonite, saponite, hectorite, mica, vermiculite, bentonite, nontronite, beidellite, volkonskoite, magadite, kenyaite. Suitable synthetic layered silicates include, but are not limited to, synthetic mica, synthetic saponite, synthetic hectorite, synthetic magadite, and synthetic kenyaite. The layered silicates may also have a modified structure, for example as a result of being fluorinated. Preferred fluorinated layered silicates include, but are not limited to, fluorinated montmorillonite, and fluorinated mica.

Preferred layered silicates are those commonly referred to as 2:1 phyllosilicates. Preferred 2:1 phyllosilicates are selected from natural, synthetic or modified montmorillonite, saponite, bentonite, and mica. Commercially available silicates may be used.

Layered double hydroxides (LDH) are a type of layered material having positively charged layers with charge balancing anions present in the interlayer. These hydroxides may be represented by the formula $[M^{2+}_{1-x}M^{3+}_x(OH)_2](A_x.yH_2O)$, where $M^{2+}$ and $M^{3+}$ can be most divalent and trivalent metal ions and $A^-$ any type of anion. The term LDH has been taken as a reference name for many isomorphous compounds containing various $M^{II}$ and $M^{III}$ metal cations (i.e. Mg, Zn, Al, Fe) and interlayer anions (i.e. $CO_3$, Cl, $SO_4$) in the LDH structure.

C. Organic Modifiers

Preferably, the solid particulate material used in accordance with the invention is a layered silicate. As sourced, layered silicates suitable for use with the invention may be in the form of an agglomeration of individual platelet particles that are closely stacked together like a deck of cards, in aggregates called tactoids. These tactoids will often be relatively large in size, and can exfoliate or delaminate to provide for smaller aggregates and/or individual platelets (single particles) upon being dispersed throughout the host polymer. However, in practice the degree of dispersion may vary.

It is well known in the art that a dispersing agent/surface modifier/organic modifier/surfactant may be used to facilitate the dispersion of the solid particulate material throughout the host polymer. The dispersing agent will exhibit a degree of surface activity toward the particulate material and promote a more efficient distribution of the particles throughout the host polymer. Generally, the dispersing agent will have surfactant-like properties whereby a portion of the agent has an affinity toward the particulate material and a separate portion of the agent has an affinity toward the host polymer. That is, greater dispersion is thought to be achieved by greater interaction between the silicate and the host polymer as facilitated by the dispersing agent.

The term 'organic modifier' (and later 'organic cation' in those embodiments where the solid particulate material is a particle having a surface having a net negative charge) is used herein to denote the dispersing agent. In the present invention, each solid particulate material is co-modified with at least two organic modifiers. Further, the at least two organic modifiers of the present invention must have properties that cause them to arrange on a surface of the solid particulate material in clusters. These properties may be the chain length, polarity, and shape of the organic modifiers.

Thus, the at least two organic modifiers of the present invention comprise at least one first organic modifier and at least one second organic modifier. The first organic modifier may have a chain length at least about 4 atoms less than the chain length of the second organic modifier. In some embodiments the first organic modifier may have a chain length at least about 5 to 20 atoms less than the chain length of the second organic modifier.

Further, the first organic modifier may have a molecular chain length of no more than 8 atoms. Preferably, the first organic modifier may have a molecular chain length of no more than 6 atoms. More preferably, the first organic modifier may have a molecular chain length of no more than 4 atoms. Most preferably, the first organic modifier is a choline compound, such as choline chloride.

Further still, the second organic modifier may have a molecular chain length of no less than 12 atoms. Preferably, the second organic modifier may have a molecular chain length of no less than 16 atoms. More preferably, the second organic modifier may have a molecular chain length of no less than 18 atoms. Most preferably, the second organic modifier is a quaternary ammonium compound, such as octadecyltrimethyl ammonium or oleyl-bis-(2-hydroxyethyl)methylammonium chloride.

The at least two organic modifiers comprise at least one polar organic modifier and at least one non-polar organic modifier in order to cause the organic modifiers to arrange on a surface of the solid particulate material in clusters. As used herein, the terms 'polar' and 'non-polar' as qualifiers for 'organic modifier' are used to refer only to the end of the organic modifier that interacts with the host polymer. That is, each organic modifier has two ends, one of which interacts with the solid particulate material and the other of which interacts with the host polymer. The amount of polarity the at least one polar organic modifier may have is any that is sufficient to cause the at least two organic modifiers to arrange on a surface of the solid particulate material in clusters. Typically, it is sufficient if the end of the polar organic modifier that interacts with the host polymer contains a polar moiety. More preferably, the polar moiety is present on the shorter first organic modifier. The polar moiety may be a hydroxyl, carbonyl, carboxyl, nitrogen containing, fluorine containing, sulphur containing or the like as is known in the art. Preferably, the polar moiety is a hydroxyl group.

The formation of regions of organic modifier on the surface of the solid particulate material can be explained by the well known theory of micelle deposition; for two organic modifiers that are not alike regions, clumps or domains will form to minimise the energy state in which they exist on the surface. This behaviour can be seen by almost any material in a similar thermodynamic arrangement. Any method known in the art may be used to predict the likelihood that the at least two organic modifiers will phase separate on the surface of the solid particulate material. For instance, the miscibility of one substance in another substance can be determined empirically by simply observing how much one substance will dissolve in another substance. For instance, in some embodiments the miscibility at atmospheric pressure and temperature of the first organic modifier may be greater than about 75 w/w % in water and the miscibility at atmospheric pressure and temperature of the second organic modifier may be less than about 5 w/w % in water. In other embodiments, the miscibility at atmospheric pressure and temperature of the first organic modifier may be greater than about 50 w/w % in water and the miscibility at atmospheric pressure and temperature of the second organic modifier may be less than about 10 w/w % in water.

Organically modified solid particulate material may be characterised using techniques known in the art, including differential scanning calorimetry (DSC), thermal gravimetric analysis (TGA), and small and wide angle x-ray spectroscopy (SAXS/WAXD). The presence of regions on the surface of the solid particulate material may be observed using contrast variation SANS (eg as described by A Nelson and T Cosgrove, *Langmuir*, 21, p9176 (2005)) in solution. In this method, the solid particulate material is contrast matched in $D_2O^1$ in order to amplify the scattering from any periodicity caused by organic modifier phase separation. One organic modifier could also be deuterated to provide additional neutron scattering length density contrast. Information is built up by gradually altering the concentration and ratio of surfactants exchanged.

The co-modification of silicates is discussed in U.S. Pat. No. 6,486,253. The problem to be solved in U.S. Pat. No. 6,486,253 is the enhancement of the gas barrier effect of polymers typically used for food storage so that they may be used for longer-term food storage without spoilage of the food by oxygen. U.S. Pat. No. 6,486,253 states that polymer composites have improved gas barrier properties, but that in order to further enhance the gas barrier properties of polymer composites (in particular polymer-clay nanocomposites) the exfoliation of the dispersed clay particulates must be achieved. Thus, U.S. Pat. No. 6,486,253 is focussed on the achievement of exfoliation. That is, the goal of U.S. Pat. No. 6,486,253 is the physical distribution of the clay particulates uniformly throughout the host polymer so that their presence physically hinders or prevents the permeation of gas molecules through the host polymer. Contrarily, the present invention is concerned with the nature of the interaction between the solid particulate material and the host polymer, and, for example, the effect of this interaction on the tensile properties of the host polymer. In any case, U.S. Pat. No. 6,486,253 does not teach the requisite properties the at least two organic modifiers must have in order to achieve the present invention.

Those skilled in the art will appreciate the various techniques and organic modifiers, commonly used to singly modify a solid particulate material, which may be employed for the purpose of co-modifying solid particulate material (including layered silicates). Generally, all such techniques and organic modifiers can be utilised to produce a modified solid particulate material having at least two organic modifiers present on a surface. However, the inventors have discovered that to co-modify the solid particulate material (including layered silicate) so that the organic modifiers form regions on the surface of the solid particulate material, it is necessary to add the organic modifiers to a solvent before the solid particulate material is added to the solvent.

In some embodiments, one useful approach for modifying a layered silicate with an organic modifier is to make use of the CEC of the layered silicate. In this case, cationic organic modifiers can be exchanged with the ion-exchangeable inorganic cations that reside between the layers of the silicate material. By this process the organic modifier can be inserted (intercalated) between the layers of the silicate material. Generally, the intercalated organic modifier functions to render the hydrophilic layered silicate structure more hydrophobic and therefore more dispersible throughout the host polymer.

Although the CEC of the layered silicate is not particularly limited, it is, for example, preferably 25 to 200 meq/100 g, more preferably 50 to 150 meq/100 g, most preferably 90 to 130 meq/100 g. If the CEC of the layered silicate is less than about 25 meq/100 g, the amount of cationic organic modifier that can be intercalated between the layers of the layered silicate by ion exchange becomes small, and the efficiency of the organic modifier is reduced. On the other hand, if the CEC exceeds about 200 meq/100 g, the ionic bonding strength between the layers of the layered silicate become too strong, and the organic modifier becomes less able to facilitate interaction between the silicate and the host polymer.

In some embodiments, the solid particulate material has an anionic exchange capacity and anionic organic modifiers may be employed. In this embodiment, any technique for modifying the surface of a solid particulate material known in the art may be used to co-modify the surface of the solid particulate material. As well, a method whereby the organic modifiers are added to a solution before the solid particulate material is added may be useful.

Ion-exchangeable organic modifiers will typically be in the form of an organic cation derived from an organic cation salt. As used herein, the term "organic cation" includes any positively charged ion which comprises at least one carbon atom having at least one bond to hydrogen or another carbon atom. The organic cation may comprise any other heteroatom of the periodic table, and the positive charge need not, and normally does not, reside on the carbon atom. However, the positive charge does typically reside on the end of the organic modifier which interacts with the solid particulate material and not typically on the end that interacts with the host polymer. More than one positive charge may be present. The organic cation will generally comprise at least one ligand or residue comprising at least 8 carbon atoms. Examples of organic cations include, but are not limited to, organometallic cations (such as ferrocenium cations and/or their derivatives), as well as "onium" cations having organic substituent groups. The organic cation is normally accompanied by a charge balancing anion, to form a salt of the organic cation. The charge balancing anion, which may be generically symbolised as "$X^-$" may be any chemically stable anionic group or residue that does not structurally change or react with the organic cation, including halides, hydroxide, carbonates, alkoxides, carboxylates, phosphates, silicates, or the like.

The paragraphs following describe suitable organic modifiers. Obviously, the variables need to be selected to provide the at least two organic modifiers that are in accordance with the present invention as described above. Organic cations may be "onium" cations having a positively charged nitrogen, phosphorus, sulfur, or oxygen atom, in addition to the at least one carbon atom. Suitable ammonium and phosphonium organic cations may be represented by the following formula (I):

(I)

where M is either nitrogen or phosphorous; and $R_1$, $R_2$, $R_3$, and $R_4$ are independently organic and/or oligomeric ligands or may be hydrogen, and at least one of $R_1$, $R_2$, $R_3$, and $R_4$ comprises at least one organic or oligomeric group comprising at least one carbon atom. Ammonium and phosphonium cations are normally accompanied by a charge balancing $X^-$ anion, to form an ammonium or phosphonium salt. Preferred $X^-$ anions may include a halide, hydroxide, or acetate anion, preferably chloride or bromide.

In formula (I) examples of useful organic ligands include, but are not limited to, linear or branched alkyl, alkenyl or alkynyl groups having from 1 to 22 carbon atoms, arylalkyl groups which are benzyl and substituted benzyl moieties including fused-ring moieties having linear chains or branches of from 1 to 100 carbon atoms in the alkyl portion of the structure, aryl groups such as phenyl and substituted phenyl including fused-ring aromatic substituents, beta, gamma unsaturated groups having six or less carbon atoms, and alkyleneoxide groups having from 2 to 6 carbon atoms, or alkylene oxide groups having repeating units comprising from 2 to 6 carbon atoms. Examples of useful oligomeric ligands include, but are not limited to poly(alkylene oxide), polystyrene, polyacrylate, polycaprolactone, and the like.

In formula (I) $R_1$ and $R_2$ may be organic ligands. At least one of $R_1$ and $R_2$ may comprise a long chain alkyl or alkenyl group having at least 8 carbon atoms, or more preferably between about 12 and 24 carbon atoms. Alkenyl groups comprise a mono-unsaturated or multiply-unsaturated hydrocarbon group of from 2 to 24 carbon atoms, or more preferably, from 12 to 22 carbon atoms. At least one of $R_1$ and $R_2$ may be a lower alkyl group (ie. an alkyl group of 1 to 4 carbon atoms), such as a methyl group.

Examples of useful organic cations in formula (I) may include, but are not limited to alkyl ammonium ions, such as tetramethyl ammonium, hexyl ammonium, butyl ammonium, bis(2-hydroxyethyl)dimethyl ammonium, hexyl benzyl dimethyl ammonium, benzyl trimethyl ammonium, butyl benzyl dimethyl ammonium, tetrabutyl ammonium, di(2-hydroxyethyl)ammonium, and the like, and alkyl phosphonium ions such as tetrabutyl phosphonium, trioctyl octadecyl phosphonium, tetraoctyl phosphonium, octadecyl triphenyl phosphonium, and the like or mixtures thereof.

Other particularly useful organic cations in formula (I) include, but are not limited to alkyl ammonium ions such as dodecyl ammonium, octadecyl trimethyl ammonium, bis(2-hydroxyethyl)octadecyl methyl ammonium, bis(2-hydroxyethyl)methyl tallow ammonium, bis(2-hydroxyethyl)methyl hydrogenated tallow ammonium, octadecyl benzyl dimethyl ammonium, and the like or mixtures thereof.

Useful alkoxylated ammonium compounds may include mono-alkoxylated, di-alkoxylated, tri-alkoxylated, and tetra-alkoxylated ammonium compounds, wherein the alkoxylate group comprises at least one alkyleneoxide group having from 2 to 6 carbon atoms. Alkoxylate groups may be hydroxyalkygroups, having at least one terminal hydroxyl (—OH) group bound to any one of the carbon atoms.

Examples of useful alkoxylate ligands include, but are not limited to hydroxyethyl, hydroxypropyl, hydroxybutyl, poly (ethylene oxide), poly(propylene oxide), poly(butylene oxide), and the like.

Useful mono-alkoxylated ammonium salts may be represented by the following formula (II):

(II)

where N represents nitrogen; $X^-$ represents an anion which may be a halide atom such as chloride or bromide; $R_1$, $R_2$, and $R_3$ may be the same or different and may be selected from organic and oligomeric ligands comprising from 1 to 30 carbon atoms or may be hydrogen; n is at least 1; $R_4$ is selected from hydrocarbons comprising from 1 to 4 carbon atoms, hydrogen, and their mixtures; and $R_5$ is selected from hydrocarbons comprising from 1 to 7 carbon atoms, and hydrogen. Illustrative of suitable mono-alkoxylated amine compounds, which are converted to the ammonium salt by reaction with a Bronsted acid, include, but are not limited to those under the trade name of JEFFAMINE (of Huntsman Chemical). A preferred mono-alkoxylated amine compounds is $(CH_3)_3N^+CH_2CH_2OH/Cl^-$.

Useful di-alkoxylated ammonium salts may be represented by the following formula (III):

(III)

where N represents nitrogen; X⁻ represents an anion which may include a halide atom such as chloride or bromide; $R_1$ and $R_2$ may be the same or different and are selected from organic and oligomeric ligands comprising from 1 to 30 carbon atoms or may be hydrogen; p and n are at least 1; and $R_3$, $R_4$, $R_5$ and $R_5$ may be same or different and are selected from hydrocarbons comprising 1 to 4 carbon atoms and hydrogen. $R_1$ and $R_2$ may be organic ligands. At least one of $R_1$ or $R_2$ may comprise a long chain alkyl or alkene group having at least 8 carbon atoms, or from about 12 to 24 carbon atoms. At least one of $R_1$ and $R_2$ may be a lower alkyl group, such as a methyl group. $R_3$, $R_4$, $R_5$ and $R_6$ may be hydrogen.

Examples of useful di-alkoxylated ammonium compounds include, but are not limited to bis(2-hydroxymethyl), octadecyl ammonium, bis(2-hydroxyethyl), octadecylmethyl ammonium, octadecylisopropoxydimethyl-l ammonium, and the like or mixtures thereof.

Useful tri-alkoxylated ammonium salts may be represented by the following formula (IV):

(IV)

where N represents nitrogen; X⁻ represents an anion which is preferably a halide atom such as chloride or bromide; $R_1$ is selected from organic and oligomeric ligands comprising from 1 to 30 carbon atoms or may be hydrogen; n, p, and q are at least 1; and $R_2$, $R_3$, $R_4$, $R_5$, $R_5$ and $R_7$ may be same or different and are selected from hydrocarbons comprising from 1 to 4 carbon atoms and hydrogen.

Useful tetra-alkoxylated ammonium salts may be represented by the following formula (V):

(V)

where N represents nitrogen; X⁻ represents an anion which may be a halide atom such as chloride or bromide; m, n, p and q are at least 1; and $R_1$, $R_2$, $R_3$, $R_4$, $R_5$, $R_6$, $R_7$ and $R_8$ may be same or different and are selected from hydrocarbons comprising 1 to 4 carbon atoms and hydrogen.

The preferred alkoxylated ammonium salts are di-ethoxylated ammonium salts represented by the following formula (VI):

(VI)

where N represents nitrogen; X⁻ represents an anion which is preferably a halide atom such as chloride or bromide; $R_1$ is selected from organic and oligomeric ligands comprising at least 8 carbon atoms; $R_2$ is selected from alkyl ligands comprising from 1 to 4 carbon atoms, or may be hydrogen; and p and n are at least 1.

Illustrative examples of suitable polyalkoxylated ammonium compounds include the hydrochloride salts of polyalkoxylated amines such as JEFFAMINE (of Huntsman Chemical), namely, JEFFAMINE-506 and JEFFAMINE 505, and an amine available under the trade name ETHOMEEN (of Akzo Chemie America), namely, ETHOMEEN 18/25, which is octadecyl bis(polyoxyethylene[15])amine, wherein the numbers in brackets refer to the total number of ethylene oxide units. A further illustrative example of a suitable polyalkoxylated ammonium compound is ETHOQUAD 18/25 (of Akzo Chemie America), which is octadecyl methyl bis(polyoxyethylene[15]) ammonium chloride, wherein the numbers in brackets refer to the total number of ethylene oxide units.

Organic cations may also be cationic lipids. These molecules are amphiphilic having both hydrophilic and hydrophobic regions. The hydrophilic region may comprise a cationic group such as the "onium" cations according to the embodiments discussed above. The hydrophobic region may, for instance, be a hydrocarbon chain or cholesterol derivative. The hydrophilic region is attached to the hydrophobic region by any suitable linker, which may, for instance, be glycerol. Some examples of suitable cationic lipids are DOTAP (a quaternary ammonium polar head group, a glycerol linker, and 2 oleoyl chains), SAINT-2 (pyridinium base with a quaternary amine whose cationic charge is delocalized over the pyridinium ring, and 2 oleoyl chains), DC Chol (a charged head group attached to cholesterol) and GS1 (a sugar-based Gemini surfactant). Typically, any cationic lipid known in the art may be used in the present invention.

In some embodiments the solid particulate material is a particle having a surface having a net positive charge. In these embodiments, the organic modifiers may be anionic. For instance, the anionic organic modifiers may be selected from alkyl sulphate, sodium stearate, alkyl benzenesulfonates, alkyl sulphonates and alkyl phosphates.

As discussed above, the at least 2 organic modifiers are used to modify at least one surface of the solid particulate material. In one embodiment, the number of organic modifiers used to modify the surface of the solid particulate material is 2. In this embodiment, the 2 organic modifiers may be added in a mol percent ratio of from 5:95 to 95:5. In other embodiments, the 2 organic modifiers may be added in a mol percent ratio of from 10:90 to 90:10. In other embodiments, the 2 organic modifiers may be added in a mol percent ratio of from 20:80 to 80:20. In other embodiments, the 2 organic modifiers may be added in a mol percent ratio of from 40:60 to 60:40. In other embodiments, the 2 organic modifiers may be added in a mol percent ratio of 50:50. In other embodiments, the number of organic modifiers used to modify the surface of the solid particulate material is greater than 2.

D. Method of Modifying the Solid Particulate Material

Techniques known in the art for modifying the surface of a solid particulate material (including layered silicates) with an organic modifier typically involve first adding a solid particulate material to a solvent. Then, the solid particulate material may be allowed time to disperse and/or swell in the solvent, which may be progressed using temperature and/or mechanical energy (eg stirring or ultrasonication). Then, the organic modifiers are added to the solid particulate material in the solvent, either at the same time or in some sequence. Some time later, the solid particulate material is retrieved from solution, typically washed and dried, to result in the modified solid particulate material. For example, U.S. Pat. No. 6,486, 253 discloses the preparation of a co-modified silicate at column 14 lines 1-29. In this case, the silicate was added to water at 85° C. and stirred for 2 hours. Then, the organic modifiers Jeffamine-506 and Jeffamine-505 were added and blended for 2 min. The modified solid particulate material was separated by centrifuge, washed, and finally dried.

This technique demonstrated in U.S. Pat. No. 6,468,253 is an example of the ionic exchange of interlayer ions, a common technique for the modification of silicates. Typically, the interlayer spacing of the silicate is 'swollen' or increased by preparing a solution of the silicate in an appropriate solvent (or liquid capable of suspending/dispersing the layered silicate). Water may be used as the solvent.

However, the inventors have discovered that a particularly useful way of utilising the ionic exchange of interlayer ions technique to co-modify a silicate solid particulate material with at least two organic modifiers is to add the organic modifiers to the solvent before the solid particulate material is added to the solvent, In more detail, the organic modifiers are first added to a solvent. The organic modifiers may be added in sequence or simultaneously. The solvent may be any that is suitable for dissolution/suspension of the organic modifiers and the solid particulate material. For instance, the solvent may be dimethylacetamide (or those described previously). The solvent may be at an elevated temperature. For instance the solvent may be at a temperature of at least about 40° C. In a preferred method, the solvent may be at a temperature of at least about 50° C. In a more preferred method, the solvent may be at a temperature of at least about 60° C. The temperature of the solvent may be any that does not result in degradation of the organic modifiers or the solid particulate material. The organic modifiers/solvent mixture may be stirred for any appropriate length of time to allow equilibrium between the organic modifiers. The extent of the mixing to result in miscellular or like immiscible behaviour of the organic modifiers would be known to the person skilled in the art.

Following equilibration of the organic modifiers in the solvent, the solid particulate material is added to the solvent mixture. The solid particulate material may be added as a single bolus or may be added stepwise. Ina preferred method the silicate is added stepwise. The solid particulate material may be added such that the final solution has any range of solid particulate material concentration, however use of a concentration that allows for satisfactory mixing of the solid particulate material and organic modifier is preferred. For instance, a solution of below about 50, w % solid particulate material is satisfactory. More preferably, the solution has below about 5 w % solid particulate material. In the case of layered silicates, to encourage swelling of the silicate layers and exchange of the organic modifier for the interlayer ion, it is possible to add energy to the solution in the form or heat, sound, kinetic or any other form of energy. For instance, the solution may be heated to any appropriate temperature, subjected to ultrasonic treatment, or may be mechanical stirred. The organic modifier/solid particulate material solution may be treated under the above conditions for any amount of time suitable to form regions of the organic modifier on the surface of the solid particulate material. Obviously, this length of time will be dependent on the specifics of the system and would be able to be determined by the skilled person. In a preferred form, the solution is allowed to mix for at least about 1 h to 3 h. In a more preferred form, the solution is allowed to mix for at least about 6 h. In a more preferred form still, the solution is allowed to mix for at least about 12 h.

Following the above procedure of the present invention, the modified solid particulate material may be either retrieved from the solvent or used as is to form a polymer composite. For instance, if the solvent used to form the modified solid particulate material is also a solvent for the host polymer, then solvent casting may be used directly. For example, the organic modifier of the solid particulate material may be undertaken in dimethylacetamide which is also a solvent for many polyurethanes. Alternatively, if the solvent used to form the modified solid particulate material is not a solvent for the host polymer, or if a method of forming the polymer composite other than solvent casting is desired, the modified solid particulate material may be retrieved from the solvent and used in a dry form. For instance, the modified solid particulate material may be retrieved from solution using any means known in the art (eg centrifugation, filtration) and then dried using any means known in the art (eg oven). The dried solid particulate material may then be ground and/or milled as required.

E. Method of Making the Polymer Composite

There are no particular limitations as to the technique used to disperse the organically modified solid particulate material throughout the host polymer matrix. The solid particulate material may, for example, be combined with monomers during their polymerisation to form the host polymer. Or, the solid particulate material may be modified with a polyol that is then polymerised to form the polymer. Or, the solid particulate material may be combined with polyol or prepolymer components prior to making the polymer composite with the host polymer. The dispersing technique could also involve dissolving the host polymer into a suitable solvent and introducing the material to the solution of polymer. The solvent from the resultant liquid composition can then be evaporated to leave the host polymer having the solid particulate material dispersed therethrough, for example as in a polymer casting or solvent casting process.

A further technique for dispersing the solid particulate material throughout the host polymer could also involve melt mixing the polymer with the solid particulate material. Suitable apparatus for melt mixing the host polymer with the solid particulate material include, but are not limited to, continuous and batch mixers, extruders such as single screw and twin screw extruders, static mixes, cavity transfer mixes and combinations of two or more thereof. It is preferred that the melt mixing is conducted in either a co- or counter-rotating twin screw extruder. The temperatures at which the melt mixing is conducted will vary depending upon the nature of the host polymer. Those skilled in the art could readily determine the appropriate temperature at which the melt mixing process should be conducted. The solid particulate material may be physically mixed with the host polymer prior to melt mixing, or may be introduced as a separate feed during melt mixing.

In one embodiment, the host polymer may comprise from about 0.1-25 w % solid particulate material. In other embodiments, the host polymer comprises at least about 0.5 w % solid particulate material. In other embodiments, the host polymer may comprises from about 0.5-10 w % solid particulate material.

In one embodiment, a polymer composite according to the above aspect has tensile strength greater than the tensile strength of the host polymer. For instance, the tensile strength of the polymer composite may be above about 110% of the tensile strength of the host polymer. Preferably, the tensile strength of the polymer composite may be above about 200% of the tensile strength of the host polymer.

In one embodiment, a polymer composite according to the above aspect has a tensile elastic modulus above about 85% of the tensile elastic modulus of the host polymer. In other embodiments, the tensile elastic modulus of the polymer composite may be not significantly greater than the tensile elastic modulus of the host polymer. In other embodiments, the tensile elastic modulus of the polymer composite may be greater than the tensile elastic modulus of the host polymer. For instance, the tensile elastic modulus of the polymer composite may be above about 200% of the tensile elastic modulus of the host polymer. In other embodiments, the tensile elastic modulus of the polymer composite may be about 300% of the tensile elastic modulus of the host polymer.

F. Uses of the Polymer Composite

By "construction" material it is meant that the composite is either used to form an entire product or is used as part of a product. For example, the composite may be moulded or shaped into a product, or may be applied as a coating to a pre-made product.

As a biomedical construction material, the polymer composite may be used to manufacture products that are used ex vivo, in vivo and in vitro. It is believed that the polymer composite in accordance with the invention will be particularly useful in manufacturing products intended for in vivo use. Examples of such products include, but are not limited to, artificial intervertebral discs (AID), breast implant shells, heart valves, heart pacemaker connectors, coatings, lead insulators and fixation devices, suture material, vascular grafts and patches, endotracheal tubes, synthetic bile ducts, stents, catheters, electrodes for functional electrical stimulation etc. Examples of ex vivo or in vitro products that may be manufactured using the polymer composite include, but are not limited to, condoms, surgical gloves, blood bags, their closures and fittings, blood oxygenating tubing, cardiac-assist pump bladders and their associated tubing, housing and coatings. The polymer composite may be used as a biomedical construction material to manufacture products suitable for use in humans and other animals.

The polymer composite may also be used in other applications such as adhesives and coatings, soft feel grips, sporting goods and equipment, footwear, fibres and textiles, hoses and tubes, films and sheets, wires and cables, mining applications including screens, anti-wear linings, actuators, electrical or optical devices (ie where strain alters optical or electrical properties of the composite material) and polaroid material.

The invention will now be described with reference to the following non-limiting examples which are included for the purpose of illustrating the invention only, and not to be construed as limiting the generality hereinbefore described.

EXAMPLES

Example 1

Preparation of the Solid Particulate Material Modified with at Least Two Organic Modifier Ions According to the Present Invention Organic modifier ions were exchanged onto the surface of a silicate in distilled, deionised water at 60° C. The organic modifier and silicates are shown in Table 1. Lucentite SWN (Lucentite) is a synthetic smectite of chemical formula $M_{x/n}^{n+}$ [$Mg_{6-x}Li_x$][$Si_8$]$O_{20}(OH)_4.nH_2O$, average platelet diameter 25-30 nm and cationic exchange capacity (CEC) of 120. Somasif ME-100 (ME-100) is a synthetic fluoromica of chemical formula $M_xMg_3(Si_{4-x}Al_x)O_{10}F_2$, average platelet diameter 500-700 nm and cationic exchange capacity (CEC) of 100. The concentration of silicate in the water did not exceed 5 w % to ensure sufficient mixing. In this study the concentration of silicate in the water was about 2 w %.

The organic modifiers were added such that there was no excess organic modifier above the CEC of the silicate so that competitive deposition of the modifiers on the silicate surface, and variations in exchanged organic modifier quantities and ratios, was minimised. Both organic modifiers were added at the same time. The silicate was added second, after allowing about 5-10 minutes for the organic modifiers to equilibrate. The silicate was added slowly until all was added. The modification was conducted at 60° C. under mechanical stirring for at least 12 hours. ODTMA and Ethoquad O/12 both have non-polar chains. Choline chloride has a polar chain.

TABLE 1

Silicates and organic modifiers used

| | | Organic modifier (numbers are mol percent) | | |
|---|---|---|---|---|
| Material | Silicate | Choline Chloride | octadecyltrimethyl ammonium (ODTMA) | oleyl-bis-(2-hydroxyethyl) methylammonium (Ethoquad O/12) |
| 1 | Lucentite | 100 | | 0 |
| 2 | Lucentite | 75 | | 25 |
| 3 | Lucentite | 50 | 50 | |
| 4 | Lucentite | 50 | | 50 |
| 5 | Lucentite | 25 | 75 | |
| 6 | Lucentite | 25 | | 75 |
| 7 | Lucentite | 0 | | 100 |
| 8 | ME-100 | 50 | | 50 |
| 9 | ME-100 | 25 | | 75 |

The silicate was then separated by centrifugation and resuspended in distilled water. This was repeated to remove unbound organic modifier and free counter ions. The washed silicate may then be dried in a 60° C. oven in the presence of a desiccant for 2-3 days as required. The dried silicate was then ground using a mortar and pestle to a fine powder, and then further dried and stored until use. Alternatively, the washed silicate may be spray dried. Spray drying is effective at silicate in water concentrations of up to 20 w %.

Each silicate was analysed for thermal stability via thermogravimetric analysis (TGA) on a Shimadzu TGA. Initially, the silicates were heated at 20° C. per minute and held at 50° C. for 2 minutes and then for 100° C. for 5 minutes to remove moisture from the system. The silicates were then tested for mass loss over a range of 100-600° C. at a heating rate of 10° C. per minute. The analysis was performed in an air environment with a gas flow rate of 60 mL/min. The results are shown in table 2.

XRD analysis was performed on a Bruker D8 advance X-ray diffractometer using CuKα radiation generated at 40 kV with a 30 mA current. Samples were scanned at a rate of 2.4° per minute in the range 2θ=1–40° using a step size of 0.02°. The silicates were lightly pressed and flattened prior to analysis to obtain a smooth surface for more accurate analysis. The results are shown in table 3.

TABLE 2

| Test sample | w % Moisture | Onset temperature of loss | % mass loss by dry weight | theoretical maximum % mass loss |
|---|---|---|---|---|
| Material 3 | 3.3 | 240 | 18.7 | 21.4 |
| Material 4 | 2.4 | 245 | 20.3 | 24.6 |
| Material 5 | 4.1 | 282 | 13.2 | 25.3 |
| Material 6 | 1.5 | 221 | 24.4 | 28.9 |
| Material 8 | 1.2 | 170 | 16.9 | 24.2 |
| Material 9 | 1.1 | 168 | 18.7 | 28.3 |

TABLE 3

| Test sample | d-spacing of modified silicate (Å) | d-spacing of silicate in aromatic TPU (Å) |
|---|---|---|
| ME-100 | 12.6 | N/A |
| Material 8 | 14.2 | Undetectable |
| Material 9 | 14.2 | Undetectable |
| Lucentite | Undetectable | N/A |
| Material 3 | Undetectable | 88 |
| Material 5 | 14.2 | 71 |
| Material 6 | Undetectable | 60 |

Comparative Example 1

Preparation of the Solid Particulate Material Modified with at Least Two Organic Modifier Ions According to Both the Method of the Present Invention and a Prior Art Method The materials and conditions used were the same as for Example 1 (the silicate being lucentite, the two organic modifiers being ODTMA and choline chloride, and the ratio of the organic modifiers being 1:1 (ie material 3 in Example 1)) for the method of the invention. For the method of the prior art, the silicate was first added to the water and then stirred for about 10-15 min to equilibrate. Then, the longer organic modifier was added to the silicate in the water and allowed 5 min to equilibrate. Then, the shorter organic modifier was added to the mixture. As for example 1, the mixture was stirred for at least 12 hours and then dried.

When the modified silicate prepared by (i) the method of the present invention and (ii) the method of the prior art was added to a TPU host polymer (using the method outlined in Example 2), the mechanical results (using the method of Example 2) clearly demonstrate the significance of the method of the present invention. That is, the host polymer had an ultimate tensile stress of about 45 MPa, the polymer composite including the modified silicate made by the prior art method had an ultimate tensile stress of about 40.5 MPa, while the polymer composite including the modified silicate made by the method of the present invention had an ultimate tensile stress of about 54 MPa.

Comparative Example 2

Preparation of the Solid Particulate Material Modified with at Least Two Organic Modifier Ions According to Both the Method of the Present Invention and a Prior Art Method For the method of the invention, the materials and conditions used were the same as for Example 1 (the silicate being Lucentite, the two organic modifiers being Ethoquad O/12 and choline chloride, and the ratio of the organic modifiers being 75%/125% (ie material 2 in Example 1)). For the method of the prior art, the silicate was first added to the water and then stirred for about 10-15 min to equilibrate. Then, the longer organic modifier was added to the silicate in the water and allowed 5 min to equilibrate. Then, the shorter organic modifier was added to the mixture. As for example 1, the mixture was stirred for at least 12 hours and then dried.

When the modified silicate prepared by (i) the method of the present invention and (ii) the method of the prior art was added to a Tecoflex EG-80A host polymer (using the method outlined in Example 2), the mechanical results (using the method of Example 2) clearly demonstrate the significance of the method of the present invention. That is, the polymer composite including the modified silicate made by the prior art method had an ultimate tensile stress of about 43.4 MPa and an elongation at break of 1134%, while the polymer composite including the modified silicate made by the method of the present invention had an ultimate tensile stress of about 46.7 MPa and an elongation at break of 1206%.

Example 2

Preparation of an Aromatic Polymer Composite and an Aliphatic Polymer Composite Having Therein Particulate Material Co-Modified with at Least Two Organic Modifier Ions The aromatic and aliphatic polymer composites were prepared using a solvent casting method. The silicate was prepared as a 5 w % solution in toluene according to the method of Example 1. This solution is placed in an ultrasonic bath for 1 hour, then subjected to a high energy ultra sonic probe for 2 minutes, and then placed in the ultrasonic bath for a further 20 minutes.

For the aromatic polymer composite, the dispersed silicate in toluene was added to a 5 wt % TPU in dimethylacetamide (DMAc). The TPU used in this study had a 1000 g/mol poly(tetramethylene oxide) (PTMO) soft segment and a 4,4'-methylene diphenyl diisocyanate (MDI) and 1,4 butanediol (BDO) hard segment. The final TPU had a shore hardness of 80 A and a hard segment concentration of 35 w %. This mixture is then dried over several days in a dry nitrogen atmosphere at 60° C. The resulting aromatic polymer composite had an organically modified silicate loading of 3 w % (ie 3 g of organically modified silicate per 100 g of host polymer) and was annealed at 70° C. for 24 hours. The polymer composite was then allowed to age for 2 weeks prior to testing to allow for the development of structure within the polymer.

For the aliphatic polymer composite, the dispersed silicate in toluene was added to a 5 wt % TPU in dimethylacetamide (DMAc). The TPU used in this study was Lubrizol EG80A which incorporated a poly(tetramethylene oxide) soft segment and a 4,4'-methylenebis (cyclohexyl isocyanate) (H12MDI and/1,4-butane diol hard segment. The final TPU had a shore hardness of 72 A and a hard segment concentration of 35 w %. This mixture is then dried over several days in a dry nitrogen atmosphere at 60° C. The resulting aliphatic polymer composite had an organically modified silicate loading of 3 w % (ie 3 g of organically modified silicate per 100 g of host polymer) and was annealed at 70° C. for 24 hours. The polymer composite was then allowed to age for 1 week prior to testing to allow for the development of structure within the polymer.

Dumbbell shaped samples of polymer composite were tested for tensile properties using an Instron model 5543. The polymer composites were strained at 50 mm/min until break. The results are shown in table 4 and table 5.

ride. The polymer used was Tecoflex EG-93A-V; a medical-grade, aliphatic, polyether-based TPU.

TABLE 4

| Test sample | Stress at 100% Strain MPa | s.d. | Stress at 200% Strain MPa | s.d. | Stress at 300% (aliphatic polymer) or 400% (aromatic polymer) Strain MPa | s.d. |
|---|---|---|---|---|---|---|
| Aromatic host polymer sample 1 | 3.42 | 0.1 | 4.34 | 0.13 | 6.24 | 0.28 |
| Aromatic host polymer + material 1 | 3.24 | 0.68 | 4.29 | 0.84 | 6.12 | 1.36 |
| Aromatic host polymer + material 3 | 3.75 | 0.07 | 4.9 | 0.07 | 7.77 | 0.24 |
| Aromatic host polymer + material 5 | 3.81 | 0.03 | 5.03 | 0.05 | 8.05 | 0.1 |
| Aromatic host polymer sample 3 | 3.33 | 0.01 | 4.24 | 0.03 | 6.12 | 0.07 |
| Aromatic host polymer + material 8 | 3.61 | 0.01 | 4.63 | 0.02 | 7.01 | 0.08 |
| Aromatic host polymer + material 9 | 3.63 | 0.07 | 4.59 | 0.09 | 6.85 | 0.16 |
| Aromatic host polymer + material 6 | 3.29 | 0.05 | 4.29 | 0.03 | 6.7 | 0.03 |
| Aliphatic host polymer sample 1 | 1.7 | | 2.5 | | 3.4 | |
| Aliphatic host polymer + material 1 | 1.9 | | 2.8 | | 3.8 | |
| Aliphatic host polymer + material 2 | 2.5 | | 3.3 | | 4.6 | |
| Aliphatic host polymer + material 4 | 2.2 | | 2.9 | | 3.9 | |
| Aliphatic host polymer + material 6 | 1.9 | | 2.6 | | 3.5 | |
| Aliphatic host polymer + material 7 | 1.8 | | 2.5 | | 3.4 | |

TABLE 5

| Test sample | Tensile Strength % change MPa | c.f. host polymer | s.d. | Young's Modulus % change MPa | c.f. host polymer | s.d. | Elongation at Break % change % | c.f. host polymer | s.d. |
|---|---|---|---|---|---|---|---|---|---|
| Aromatic host polymer control 1 | 26.95 | 0 | 4.71 | 8.1 | 0 | 0.82 | 1625 | 0 | 83.2 |
| Aromatic host polymer + material 1 | 37.39 | 38.73 | 0.99 | 7.8 | −3.70 | 1.08 | 1222 | −24.8 | 73.3 |
| Aromatic host polymer + material 3 | 60.22 | 123.45 | 7.27 | 8.5 | 4.93 | 1.02 | 1357 | −16.49 | 125 |
| Aromatic host polymer + material 5 | 55.93 | 107.53 | 4.26 | 9.1 | 12.34 | 0.19 | 1317 | −18.95 | 63.9 |
| Aromatic host polymer control 2 | 24.16 | 0 | 1.21 | 7.7 | 0 | 0.05 | 1698 | 0 | 36 |
| Aromatic host polymer + material 6 | 55.93 | 131.49 | 2.11 | 8.4 | 9.09 | 0.49 | 1662 | −2.12 | 56 |
| Aromatic host polymer + material 8 | 48.07 | 98.96 | 4.01 | 8.9 | 15.58 | 0.94 | 1601 | −5.71 | 48 |
| Aromatic host polymer + material 9 | 40.2 | 66.39 | 6.4 | 9.7 | 25.97 | 1.09 | 1547 | −8.89 | 53.5 |
| Aliphatic host polymer control 1 | 29.69 | 0 | 2.95 | 4 | 0 | | 993 | 0 | 46.8 |
| Aliphatic host polymer + material 1 | 29.70 | 0.04 | 2.92 | 4.9 | 23.3 | | 1097 | 10.5 | 42.2 |
| Aliphatic host polymer + material 2 | 31.14 | 4.87 | 1.96 | 8.2 | 105 | | 1088 | 9.5 | 36.5 |
| Aliphatic host polymer + material 4 | 41.94 | 41.27 | 2.14 | 5.7 | 42.5 | | 1148 | 15.6 | 29.4 |
| Aliphatic host polymer + material 6 | 39.21 | 32.07 | 4.04 | 4.4 | 10.3 | | 1243 | 25.1 | 56.5 |
| Aliphatic host polymer + material 7 | 31.05 | 4.60 | 1.57 | 4.3 | 7.5 | | 1106 | 11.3 | 102 |

Example 3

Preparation of an Aliphatic Polymer Composite Having Therein Particulate Material Co-Modified with at Least Two Organic Modifier Ions The solid particulate material used was Lucentite. This solid particulate material was organically modified according to the method of Example 1 and used as a dried, ground powder. The organic modifiers were either 100% Ethoquad O/12, or 75 mol % Ethoquad O/12:25 mol % Choline chlo- The polymer composite was prepared using a melt processing method. Briefly, a dry mixture of polymer pellets and dried solid particulate material was fed into a Poly Lab Rheodrive 7 extruder with Rheomix 16 40:1 L/D attachment. The extruder was operated at a screw speed of 120 rpm and with a temperature profile along its length (about 64 cm) as shown in Table 6. The resultant extrudate was collected and pelletized, then compression moulded into flat sheets about 0.5 mm thick. These sheets were then annealed at 70 degrees C. for 24 h in a vacuum oven. From these sheets tensile dumbbells were cut. Polymer composites having an organically modified silicate loading of 4 wt % (ie approximately 4 g of organically modified silicate per 100 g of nanocomposite) were prepared. The polymer composite was then allowed to age for 2 weeks prior to testing to allow for the development of structure within the polymer.

Dumbbell shaped samples of polymer composite were tested for tensile properties using an Instron model 5543. The polymer composites were strained at 50 mm/min until break. The results are shown in Table 7.

TABLE 6

| Extruder temperature profile (° C.): | | | | | | | | | |
|---|---|---|---|---|---|---|---|---|---|
| Zone 1 | Zone 2 | Zone 3 | Zone 4 | Zone 5 | Zone 6 | Zone 7 | Zone 8 | Zone 9 | Die |
| 230 | 230 | 230 | 225 | 215 | 200 | 205 | 190 | 180 | 170 |

TABLE 7

| | Control | 100% Ethoquad | 75/25 |
|---|---|---|---|
| Ultimate tensile strength [MPa] | 54.8 | 58.3 | 59.4 |
| Elongation at break [%] | 855 | 876 | 747 |
| Stress at 100% strain [MPa] | 5.8 | 7.1 | 8.9 |
| Stress at 300% strain [MPa] | 13.8 | 15.1 | 19.6 |
| Tear strength [kN/m] | 78 | 88.5 | 96.6 |

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A method for modifying a surface of solid particulate material, the method comprising the steps of:
   (i) adding at least two organic modifiers in a solvent to form a mixture of organic modifiers, the at least two organic modifiers comprising at least one polar organic modifier and at least one non-polar organic modifier, wherein the polar organic modifier has a molecular chain length of no more than 8 atoms; and
   (ii) adding the solid particulate material to the mixture of organic modifiers;
   wherein the organic modifiers arrange on the surface of the particulate material in regions, each region consisting essentially of one organic modifier, to thereby modify the surface of the particulate material.

2. The method according to claim 1, wherein the organic modifiers are allowed to equilibrate in the solvent for at least 5 minutes prior to addition of the solid particulate material.

3. The method according to claim 1 further comprising the step of isolating and drying the modified solid particulate material.

4. Modified solid particulate material having dimensions of less than 2000 nm; the particles having at least one surface modified with at least two organic modifiers comprising at least one polar organic modifier and at least one non-polar organic modifier, wherein the polar organic modifier has a molecular chain length of no more than 8 atoms;
wherein the at least two organic modifiers are arranged on the surface of the particulate material in regions, each region consisting essentially of one organic modifier.

5. Polymer composite comprising host polymer having solid particulate material dispersed therethrough,
the host polymer having at least one phase nanodomain;
the solid particulate material having (i) dimensions of less than 2000 nm, and (ii) at least one surface modified with at least two organic modifiers comprising at least one polar organic modifier and at least one non-polar organic modifier;
wherein the at least two organic modifiers are arranged on the surface of the particulate material in regions, each region consisting essentially of one organic modifier, wherein the polar organic modifier has a molecular chain length of no more than 8 atoms.

6. The polymer composite according to claim 5, wherein the solid particulate material is dispersed uniformly within the host polymer.

7. The polymer composite according to claim 5, wherein the polar organic modifier has a chain length at least 4 atoms less than the chain length of the non-polar organic modifier.

8. The polymer composite according to claim 5, wherein the polar organic modifier has a chain length at least 5 to 20 atoms less than the chain length of the non-polar organic modifier.

9. The polymer composite according to claim 5, wherein the non-polar organic modifier has a molecular chain length of no less than 12 atoms.

10. The polymer composite according to claim 5 wherein the polar organic modifier is a choline compound.

11. The polymer composite according to claim 10, wherein the polar organic modifier is choline chloride.

12. The polymer composite according to claim 5, wherein the non-polar organic modifier is of the Formula (I)

where
M is either nitrogen or phosphorous;
$R_1, R_2, R_3,$ and $R_4$ are independently organic and/or oligomeric ligands or hydrogen, and at least one of $R_1, R_2, R_3,$ and $R_4$ comprises at least one organic or oligomeric group comprising at least one carbon atom; and
$X^-$ is a charge balancing anion.

13. The polymer composite according to claim 12, wherein the non-polar organic modifier is a quaternary ammonium compound.

14. The polymer composite according to claim 13, wherein the non-polar organic modifier is selected from the group consisting of octadecyltrimethyl ammonium and oleyl-bis-(2-hydroxyethyl)methylammonium chloride.

15. The polymer composite according to claim 5, wherein the host polymer is a segmented polyurethane.

16. The polymer composite according to claim 5, wherein the solid particulate material is a layered silicate.

17. The polymer composite according to claim 16, wherein the layered silicate is selected from the group consisting of natural montmorillonite, synthetic montmorillonite, natural saponite, synthetic saponite, natural bentonite, synthetic bentonite, natural mica, synthetic mica, and mixtures thereof.

18. The polymer composite according to claim 5, wherein the tensile strength of the polymer composite is about 110% to about 250% relative to the tensile strength of the host polymer.

19. The polymer composite according to claim 5, wherein the tensile elastic modulus of the polymer composite is about 85% to about 300% relative to the tensile elastic modulus of the host polymer.

20. A method of preparing a polymer composite comprising the step of dispersing modified solid particulate material according to claim 4 in a host polymer.

21. A biomaterial comprising a polymer composite according to claim 5.

22. A biomedical device comprising a polymer composite according to claim 5.

23. The method according to claim 1, wherein the non-polar organic modifier has a molecular chain length of not less than 12 atoms.

24. The method according to claim 1, wherein the polar organic modifier is choline chloride.

25. The method according to claim 1, wherein the non-polar organic modifier is a quaternary ammonium compound.

26. The method according to claim 1, wherein the non-polar organic modifier is selected from the group consisting of octadecyltrimethyl ammonium and oleyl-bis-(2-hydroxyethyl)methylammonium chloride.

27. The modified solid particulate material according to claim 4, wherein the non-polar organic modifier has a molecular chain length of no less than 12 atoms.

28. The modified solid particulate material according to claim 4, wherein the polar organic modifier is choline chloride.

29. The modified solid particulate material according to claim 4, wherein the non-polar organic modifier is a quaternary ammonium compound.

30. The modified solid particulate material according to claim 4, wherein the non-polar organic modifier is selected from the group consisting of octadecyltrimethyl ammonium and oleyl-bis-(2-hydroxyethyl)methylammonium chloride.

31. The method according to claim 20, wherein the host polymer is selected from the group consisting of poly(acrylic acid), poly(butyl methacrylate), polycarbonate, poly(dimethylsiloxane), poly(ethylene oxide), poly(ethylene propylene), poly(ethyl vinyl acetate), poly(methyl methacrylate), polystyrene, poly(vinyl acetate), poly(vinyl methyl ether), poly(vinyl pyrolidone), poly(dimethyl diallyl ammonium chloride), polyethylene, polypropylene, polyimide, poly(propylene carbonate), and combinations thereof.

32. The method according to claim 20, wherein the host polymer is selected from the group consisting of poly(acrylic acid), poly(butyl methacrylate), poly(methyl methacrylate), and combinations thereof.

33. The method according to claim 20, wherein the host polymer is a segmented polyurethane.

34. The method according to claim 20, wherein the solid particulate material is a layered silicate.

35. Polymer composite comprising a host polymer having solid particulate material dispersed therethrough,
the solid particulate material having (i) dimensions of less than 2000 nm, and (ii) at least one surface modified with at least two organic modifiers comprising at least one polar organic modifier and at least one non-polar organic modifier;
wherein the at least two organic modifiers are arranged on the surface of the particulate material in regions, each region consisting essentially of one organic modifier, wherein the polar organic modifier has a molecular chain length of no more than 8 atoms.

36. The polymer composite according to claim 35, wherein the solid particulate material is dispersed uniformly within the host polymer.

37. The polymer composite according to claim 35, wherein the non-polar organic modifier has a molecular chain length of no less than 12 atoms.

38. The polymer composite according to claim 35, wherein the polar organic modifier is choline chloride.

39. The polymer composite according to claim 20, wherein the non-polar organic modifier is a quaternary ammonium compound.

40. The polymer composite according to claim 35, wherein the non-polar organic modifier is selected from the group consisting of octadecyltrimethyl ammonium and oleyl-bis-(2-hydroxyethyl)methylammonium chloride.

41. The polymer composite according to claim 35, wherein the host polymer is selected from the group consisting of poly(acrylic acid), poly(butyl methacrylate), polycarbonate, poly(dimethylsiloxane), poly(ethylene oxide), poly(ethylene propylene), poly(ethyl vinyl acetate), poly(methyl methacrylate), polystyrene, poly(vinyl acetate), poly(vinyl methyl ether), poly(vinyl pyrolidone), poly(dimethyl diallyl ammonium chloride), polyethylene, polypropylene, polyimide, poly(propylene carbonate), and combinations thereof.

42. The polymer composite according to claim 35, wherein the host polymer is selected from poly(acrylic acid), poly(butyl methacrylate), poly(methyl methacrylate), and combinations thereof.

43. The polymer composite according to claim 35, wherein the solid particulate material is a layered silicate.

* * * * *